(12) United States Patent
Kurian et al.

(10) Patent No.: US 11,621,977 B2
(45) Date of Patent: *Apr. 4, 2023

(54) NETWORK FORENSIC SYSTEM FOR PERFORMING TRANSMISSION METADATA TRACKING AND ANALYSIS

(71) Applicant: Bank of America Corporation, Charlotte, NC (US)

(72) Inventors: Manu Kurian, Dallas, TX (US); Jayachandra Varma, Irving, TX (US); Gopikrishna Nemalikanti, Frisco, TX (US); Jason T. Findley, Jacksonville, FL (US); Sorin Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/524,118

(22) Filed: Nov. 11, 2021

(65) Prior Publication Data

US 2022/0070208 A1 Mar. 3, 2022

Related U.S. Application Data

(63) Continuation of application No. 16/403,695, filed on May 6, 2019, now Pat. No. 11,240,265.

(51) Int. Cl.
*G06N 5/02* (2023.01)
*H04L 9/40* (2022.01)
*G06F 16/23* (2019.01)

(52) U.S. Cl.
CPC ...... *H04L 63/1466* (2013.01); *G06F 16/2365* (2019.01); *G06N 5/02* (2013.01); *H04L 63/1416* (2013.01); *H04L 63/1425* (2013.01)

(58) Field of Classification Search
USPC .......................................................... 726/23
See application file for complete search history.

(56) References Cited

U.S. PATENT DOCUMENTS

| 7,181,450 B2 | 2/2007 | Malloy et al. |
| 8,145,579 B2 | 3/2012 | Iqbal |

(Continued)

FOREIGN PATENT DOCUMENTS

| AU | 2014205389 A1 * | 6/2015 | ........... G06F 21/552 |
| CN | 101557349 A * | 10/2009 | |

OTHER PUBLICATIONS

"Are Reserved/Unused Fields in TCP Header Preserved Over the Network?" https://networkengineering.stackexchange.com/questions/32966/are-reserved-unused-fields-in-tcp-header-preserved-over-the-network/32967, Stack Exchange Inc., Retrieved on Mar. 6, 2019.

(Continued)

*Primary Examiner* — Sakinah White Taylor
(74) *Attorney, Agent, or Firm* — Weiss & Arons LLP

(57) ABSTRACT

A method for extracting, correlating, consolidating and presenting metadata from transmissions is provided. The method may include receiving a TCP/IP transmission. The transmission may include a header and a body. The method may include extracting an originating IP address from a location of the transmission. The location may be in the header or in the body. The IP address may be extracted in binary form. The method may include determining an accuracy and validity metric of the transmission using an artificial intelligence module. The method may include converting the extracted IP address from binary form into hexadecimal form. The method may include embedding the hexadecimal form of the IP address into one or more unused options of the header. The method may include processing (Continued)

the transmission. The processing may be completed upon determination that the transmission is a valid transmission.

20 Claims, 2 Drawing Sheets

(56) References Cited

U.S. PATENT DOCUMENTS

| | | |
|---|---|---|
| 8,315,275 B2 | 11/2012 | Nag |
| 8,706,707 B2 | 4/2014 | Liebich et al. |
| 8,842,636 B2 | 9/2014 | Zhou et al. |
| 9,130,879 B2 | 9/2015 | Petrus et al. |
| 9,300,579 B2 | 3/2016 | Frost et al. |
| 9,413,783 B1 * | 8/2016 | Keogh ............... H04L 63/1458 |
| 9,660,909 B2 | 5/2017 | Guichard et al. |
| 10,165,092 B2 | 12/2018 | Ruan et al. |
| 10,212,022 B2 | 2/2019 | Garg et al. |
| 2014/0325653 A1 * | 10/2014 | Altman ............... H04L 63/1416 726/23 |
| 2015/0019748 A1 * | 1/2015 | Gross, IV ............... H04L 47/36 709/230 |
| 2015/0288634 A1 * | 10/2015 | Emigh .................. H04L 51/212 709/206 |
| 2018/0103050 A1 * | 4/2018 | Mason .................. H04L 63/168 |
| 2018/0367575 A1 | 12/2018 | Narayanaswamy et al. |

OTHER PUBLICATIONS

"Transmission Control Protocol," https://en.wikipedia.org/wiki/Transmission_Control_Protocol, Wikimedia Foundation, Inc., Mar. 15, 2019.

"The IP Datagram," http://www.rbyshaden.com/pdgram.htm. Retrieved on Mar. 28, 2019.

* cited by examiner

```
1 when CLIENT_ACCEPTED {
2 set INPUT_OPTION [TCP::option get 28]
3 binary scan $INPUT_OPTION c ver
4 set ver [expr { $ver & 0xff }]
5 set forwarded_ip [IP::addr parse $INPUT_OPTION 1]
6 log local0. "The IP address was $forwarded_ip for version $ver"
7 }

1 when SERVER_CONNECTED {
2 scan [IP::client_addr] {%d.%d.%d.%d} a b c d
3 TCP::option set 28 [binary format cccc $a $b $c $d] all
4 }
```

FIG. 2

NETWORK FORENSIC SYSTEM FOR PERFORMING TRANSMISSION METADATA TRACKING AND ANALYSIS

CROSS-REFERENCE TO RELATED APPLICATION

This application is a continuation of U.S. patent application Ser. No. 16/403,695 filed on May 6, 2019, now U.S. Pat. No. 11,240,265 and entitled "NETWORK FORENSIC SYSTEM FOR PERFORMING TRANSMISSION METADATA TRACKING AND ANALYSIS" which is hereby incorporated by reference herein in its entirety.

FIELD OF TECHNOLOGY

This disclosure relates to tracking and analyzing transmission metadata.

BACKGROUND

Conventionally, transmission control protocol/internet protocol ("TCP/IP") transmissions are transmitted from sending entities to receiving entities. After being transmitted from a sending entity, and prior to being received by a receiving entity, the transmissions may pass through one or more processing systems. The processing systems may be responsible various tasks, such as fraud detection and transmission cost calculation.

Typical TCP/IP transmissions include a body and a header. Many times, the body of the transmission is encrypted. The encrypted transmission body may only be decryptable, and therefore, readable, by the receiving entity.

The processing systems, which are situated between the sending entity and the receiving entity, may be unable to read the transmission body. Therefore, conventional processing systems have difficulties performing their designated tasks. Specifically, the processing systems incur difficulties when attempting to detect malicious code included in transmission bodies.

It would be desirable for a processing system that embeds metadata into an unencrypted header of a TCP/IP transmission. The embedded metadata data may enable accurate transmission tracking, appropriate fraud detection, transmission cost calculation and many other suitable tasks.

SUMMARY OF THE DISCLOSURE

A method for extracting, correlating, consolidating and presenting metadata from transmissions is provided. The method may include receiving a TCP/IP transmission from a sender. In some embodiments, the method may include stamping the transmission with a transmission identifier upon receiving the transmission.

The transmission may be intended for a receiving entity. The transmission may include a body and a header. The header may include mandatory fields. The header may include optional fields. The header may include 255 options. A portion of the options, or optional fields, may be unused. The header may identify the sender, the destination and a sequence number of the transmission.

In some embodiments, the minimum size of the header is 5 32-bit words, which may be equal to 20 bytes. In some embodiments, the maximum size of the header may be 15 32-bit words, which may be equal to 60 bytes. In other embodiments, each option within the header may be able to hold a maximum of 40 bytes. The body, or data section, may follow the header.

The method may include extracting an original internet protocol ("IP") address from an IP address location included in the transmission. The originating IP address may be extracted in a binary format.

The method may include determining an accuracy and validity metric of the transmission. An artificial intelligence module may determine the accuracy and validity metric. The artificial intelligence module may review a plurality of metadata elements included in the transmission. The plurality of metadata elements may include a queue selection, a transmission time stamp, the originating IP address, a downstream destination location and a plurality of transmission network stops. Each transmission network stop may include a location in which the transmission was located. Each transmission network stop may include one or more metadata modifications that occurred at the location. Each transmission network stop may also include a valid reason for the one or more metadata modifications.

The artificial intelligence module may compare the originating IP address to the remaining metadata elements within the transmission. The method may include determining whether the transmission is a valid transmission or an invalid transmission. The determining whether the transmission is a valid transmission may include determining whether the transmission has been hacked by a man-in-the-middle attack or other intruder. The determination may be based on the review and the comparison. The artificial intelligence module may quarantine the transmission when the transmission is determined to be an invalid transmission.

The method may include converting the extracted IP address from binary form into hexadecimal form when the transmission is determined to be a valid transmission. The method may include embedding the hexadecimal form of the IP address into one or more unused options, included in the 255 options or plurality of optional fields, when the transmission is determined to be a valid transmission. The one or more unused options may include options 31-252. In some embodiments, the hexadecimal form of the IP address may be embedded into option 31 of the header of the transmission.

The method may include processing the transmission when the transmission is determined to be a valid transmission.

In some embodiments, prior to processing the transmission, the method may include extracting a hexadecimal form of the IP address from the one or more unused options. The method may include converting the hexadecimal form of the IP address into a binary form of the IP address. The method may include inserting the binary form of the IP address into the IP address location of the transmission.

In some embodiments, the artificial intelligence module flags the transmission when the transmission is determined to be inconsistent with other transmissions received form the sender. The artificial intelligence module may transmit the transmission that has been flagged for operator review.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows illustrative software code in accordance with principles of the invention.

DETAILED DESCRIPTION

Figure 1:
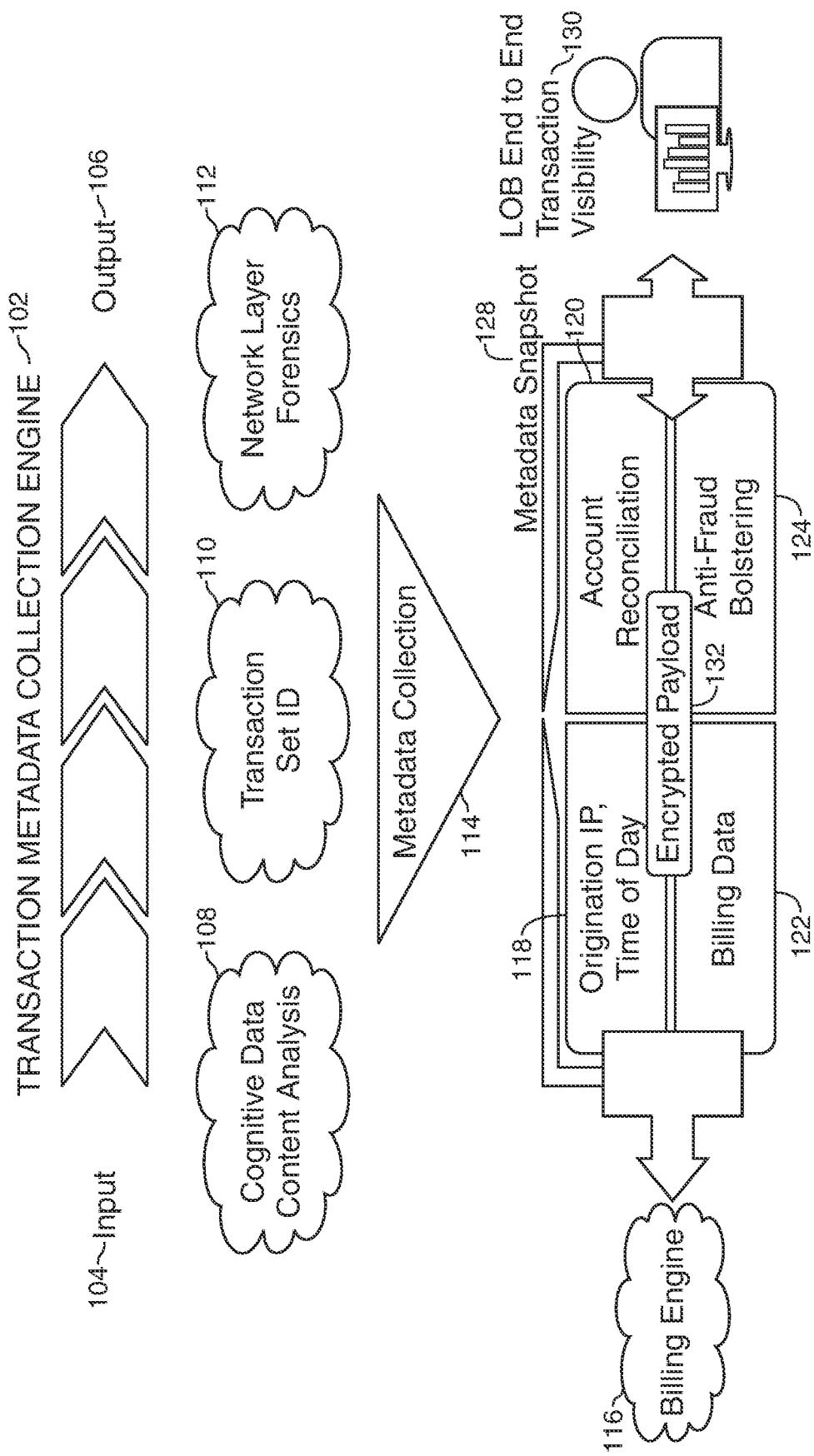
FIG. 1 shows an illustrative diagram in accordance with principles of the invention.

A system operable to analyze, review, consolidate and present a real-time view of transmission traffic patterns is provided. The system may include a receiver. The receiver may be operable to receive a plurality of TCP/IP transmissions. Each transmission may include a header and a body.

Each transmission may include a plurality of metadata elements within a portion of the header. The portion of the header may have been previously determined to be unused. Each metadata element may include an originating IP address, a sent timestamp for the transmission, account reconciliation data and billing data. The originating IP address may be stored within an unused option within the header.

The system may also include an artificial intelligence module. The artificial intelligence module may include a transmission identification stamper sub-module. The transmission identification stamper sub-module may be operable to stamp each transmission with an identifier. The identifier may enable the system to identify the transmission.

The artificial intelligence module may also include a network layer forensic detector sub-module. The network layer forensic detector sub-module may be operable to detect an originating location of the transmission. The detection may enable the system to identify man-in-the-middle attacks. A man-in-the-middle attack may APPEAR TO be a communication that is transmitted from an authentic sender to an authentic receiver. However, the communication may actually have been intercepted by a malicious actor, who may alter the communication in a malicious manner, while maintaining the authenticity of the sender and receiver.

The artificial intelligence module may also include a cognitive data and content analysis sub-module. The cognitive data and content analysis sub-module may be operable to, for each identified transmission, extract technical characteristics. The cognitive data and content analysis sub-module may also be operable to, for each identified transmission, retrieve stored historic technical characteristics. The stored historic technical characteristics may include a predetermined amount of data that is corresponding to data included in the extracted technical characteristics.

The cognitive data and content analysis sub-module may also be operable to, for each identified transmission, compare the stored historic technical characteristics to the extracted technical characteristics in order to identify an anomalous transmission. The cognitive data and content analysis sub-module may quarantine an identified anomalous transmission. Quarantining a transmission may be mean placing the anomalous transmission in a guarded portion of memory. The guarded portion of memory may disable segments of the transmission in order to avoid execution of a malicious transmission. The cognitive data and content analysis sub-module may store the technical characteristics of the transmission and whether the transmission was quarantined.

The system may also include a real-time display. The real-time display may be operable to display each transmission together with results of the artificial intelligence module. The real-time display may arrange the transmission to be displayed based on sender.

In some embodiments, a system user, associated with a first sender, may be only able to view transmission associated with the first sender.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative metadata collection diagram. Transaction metadata collection engine 102 may receive input 104. Transaction metadata collection engine 102 may generate output 106.

Input 104 may include a transaction. Engine 102 may perform cognitive data and content analysis on the transaction, as shown at 108. Performing cognitive data and content analysis may include extracting the technical characteristics from the transaction. The technical characteristics may include sender data, receiver data, a timestamp indicating when the transaction was transmitted and any other suitable technical characteristics. It should be appreciated that the content of the transaction may be encrypted, and therefore unavailable to engine 102. It should be noted that the analysis performed on the technical characteristics of the transaction may be important to identify malicious transactions or transactions with which a malicious actor has tampered.

Performing cognitive data and content analysis may include comparing the extracted technical characteristics to stored historic technical characteristics. The engine may determine whether the extracted technical characteristics match a transmission pattern that has been previously determined to be authentic. For example, establishment XYZ transmits transmissions to receiver ABC every Wednesday between 1:00 PM and 4:00 PM. Transmission 45-56_FOW is received by establishment XYZ on Wednesday, April 12 at 3:00 PM, to be transmitted to receiver ABC. Engine 102 may determine transmission 45-56_FOW to be authentic based on the previously defined transmission traffic pattern. Engine 102 may quarantine a transaction or transmission that does not appear to be in sync with a predetermined traffic pattern. Engine 102 may also update the historic storage based on the received transaction and whether or not the transaction was quarantined.

Engine 102 may also stamp each input, or transaction, with an identifier when it is received at the system, as shown at 110. Engine 102 may also perform network layer forensics, shown at 112, on the transaction. Network layer forensics may include determining the origin of the transaction. Network layer forensics may also include determining whether the transaction was intercepted by a man-in-the-middle attack or other interceptor of malicious intent.

The metadata collection may be shown at 114. Metadata snapshot, shown at 128, may show an exemplary metadata snapshot that may be retrieved from a transmission. Encrypted payload, shown at 132, may be the body of the transmission. The body of the transmission may be encrypted, as discussed above. Metadata snapshot 128 may include an origination IP address and transmission time of day, as shown at 118. Metadata snapshot 128 may include account reconciliation data, as shown at 120. Metadata snapshot 128 may also include billing data, as shown at 122. Billing data 122 may be transmitted to billing engine 116. Billing data 122 may identify various components of the transmission in order to properly bill the sending entity. Metadata snapshot 128 may also include anti-fraud bolstering capabilities, shown at 124. Because engine 102 is able to appropriately identify and track each transmission, fraudulent transmissions are quarantined and/or removed prior to producing damage.

Engine 102 may also include a real-time display. The real-time display may enable a system user to view each transaction using the identifier. The real-time display may also provide end-to-end transaction visibility, as shown at 130.

FIG. 2 shows an illustrative software code snippet that may be implemented in order to insert metadata into an option of a TCP/IP header. This code may be incorporated into a larger code block in order to conserve the source IP address. There may be other ways to perform the method set forth in the code snippet, which are included within the scope of the disclosure.

Line 1 of the software code may identify a code segment when a client device has accepted a packet, thereby stating that the device is ready to accept a message.

Line 2 of the software code may set a variable named Input_Option equal to option 28 retrieved from a TCP/IP header.

Line 3 of the software code may create a binary scan, allocate a portion of memory to the binary scan and identify the binary scan with the variable name ver.

Line 4 of the software code may set the variable ver to an expression of ver as a hexadecimal number.

Line 5 of the software code may set the forwarded IP address to an IP address parsed by INPUT_OPTION.

Line 6 of the software code may transmit a log to a local computer. The log may include the original IP address and the updated IP address.

The second line 1 of the software code may show a method when the server is connected.

The second line 2 of the software code may scan for the hexadecimal stored IP address.

The second line 3 of the software code may retrieve the stored hexadecimal IP address and update the current IP address to a binary version of stored IP address.

The code snippet may identify the memory location of an unused option of a TCP/IP header of a TCP/IP transmission. The identified memory location may be given a variable name.

The code snippet may identify the originating IP address of the TCP/IP transmission. The originating IP address may be located in an IP address location of the transmission. The originating IP address may be transformed from a binary number into a hexadecimal number. The hexadecimal number may be placed in the memory location identified by the variable name.

During the processing of the transmission, the originating IP address included in the IP address location may be changed for a valid reason. Therefore, after the transmission processing concludes, the location of the IP address may include an IP address that is different than the originating IP address. In order to correctly identify the originating IP address of the transmission, the originating IP address may be retrieved from the TCP/IP header. The retrieved IP address may be transformed from hexadecimal form into binary form. The binary form of the originating IP address may be stored in, and overwrite the contents of, the IP address location of the transmission.

It should be appreciated that other metadata elements, such as receiver data or billing data may also be placed into other unused options of the TCP/IP header. The other metadata elements may also be replaced into other memory locations upon completion of the transmission processing.

Thus, apparatus and methods for providing a network forensic system that performs transmission metadata tracking and analysis are provided. Persons skilled in the art will appreciate that the present invention can be practiced by other than the described embodiments, which are presented for purposes of illustration rather than of limitation. The present invention is limited only by the claims that follow.

What is claimed is:

1. A method for extracting, correlating, consolidating and presenting metadata from transmissions, the method comprising:

receiving a transmission control protocol/internet protocol ("TCP/IP") transmission from a sender, said TCP/IP transmission comprising a body and a header, said header comprising 255 options;

extracting an originating IP address from an IP address location of the TCP/IP transmission, said originating IP address being extracted in a binary form;

determining an accuracy and validity metric of the TCP/IP transmission using an artificial intelligence module, said artificial intelligence module:

reviewing a first plurality of metadata elements included in the TCP/IP transmission, the first plurality of metadata elements comprising:

the originating IP address;

comparing the originating IP address to a second plurality metadata elements within the TCP/IP transmission;

based on the reviewing and the comparing, determining whether the TCP/IP transmission is a valid transmission or an invalid transmission;

quarantining the TCP/IP transmission when the TCP/IP transmission is determined to be an invalid transmission;

converting the extracted IP address from binary form into hexadecimal form when the TCP/IP transmission is determined to a valid transmission;

embedding the hexadecimal form of the IP address into one or more unused options included in the 255 options when the TCP/IP transmission is determined to be valid transmission; and processing the TCP/IP transmission when the TCP/IP transmission is determined to be a valid transmission.

2. The method of claim 1, wherein the method further comprises, prior to processing the TCP/IP transmission:

extracting the hexadecimal form of the IP address;

converting the hexadecimal form of the IP address into binary form; and inserting the binary form of the IP address into the IP address location of the TCP/IP transmission.

3. The method of claim 1, further comprising upon receiving the TCP/IP transmission, stamping the TCP/IP transmission with a transmission identifier.

4. The method of claim 1, wherein the determining whether the TCP/IP transmission is a valid transmission includes determining whether the TCP/IP transmission has been hacked by a man-in-the-middle attack.

5. The method of claim 1, wherein the one or more unused options comprise options 31-252.

6. The method of claim 5, wherein the hexadecimal form of the IP address is embedded into option 31 of the header of the TCP/IP transmission.

7. The method of claim 1, wherein the artificial intelligence module flags the TCP/IP transmission when the TCP/IP transmission is determined to be inconsistent with other TCP/IP transmissions received from the sender.

8. The method of claim 7, wherein the artificial intelligence module transmits the TCP/IP transmission that has been flagged for operator review.

9. A system operable to analyze, review, consolidate and present a real-time view of transmission traffic patterns, the system comprising:
  a receiver operable to receive a plurality of transmission control protocol/internet protocol ("TCP/IP") transmissions, each transmission comprising a header and a body, each TCP/P transmission comprising a plurality of metadata elements within a portion of a header, said portion of the header being previously determined to be unused;
  an artificial intelligence module comprising:
    a TCP/IP transmission identification stamper sub-module operable to stamp each TCP/IP transmission with an identifier in order to identify the TCP/IP transmission;
    a network layer forensic detector sub-module operable to detect an originating location in order to identify man-in-the-middle attacks;
    a cognitive data and content analysis sub-module operable to:
      for each identified TCP/IP transmission:
        extract a plurality of technical characteristics;
        retrieve stored historic technical characteristics, said stored historic technical characteristics including a predetermined amount of data that is equivalent to data included in the technical characteristics that have been extracted;
        compare the stored historic technical characteristics to the extracted technical characteristics in order to identify an anomalous transmission;
        quarantine an identified anomalous transmission; and
        store the technical characteristics of the TCP/IP transmission and whether the TCP/IP transmission was quarantined; and
  a real-time display operable to display each TCP/IP transmission together with results of the artificial intelligence module.

10. The system of claim 9, wherein:
  each plurality of metadata elements comprises an originating internet protocol ("IP") address, and
  the originating IP address is stored in hexadecimal format within an unused option within the header.

11. The system of claim 9, wherein the real-time display is further operable to arrange the TCP/IP transmission to be displayed based on sender.

12. The system of claim 11, wherein, a user, associated with a first sender, is only able to view TCP/IP transmissions associated with the first sender.

13. A method for extracting, correlating, consolidating and presenting metadata from transmissions, the method comprising:
  receiving a transmission control protocol/internet protocol ("TCP/IP") transmission from a sender, said TCP/IP transmission comprising a body and a header, said header comprising a plurality of options;
  extracting an originating IP address from an IP address location of the TCP/IP transmission, said originating IP address being extracted in a binary form;
  determining an accuracy and validity metric of the TCP/IP transmission using an artificial intelligence module, said artificial intelligence module:
    reviewing a first plurality of metadata elements included in the TCP/IP transmission, the first plurality of metadata elements comprising
      the originating IP address;
    comparing the originating IP address to a second plurality of metadata elements within the TCP/IP transmission;
    based on the reviewing and the comparing, determining whether the TCP/IP transmission is a valid transmission or an invalid transmission;
    quarantining the TCP/IP transmission when the TCP/IP transmission is determined to be an invalid transmission;
  converting the extracted IP address from binary form into hexadecimal form when the TCP/IP transmission is determined to a valid transmission;
  embedding the hexadecimal form of the IP address into one or more unused options included in the plurality of options when the TCP/IP transmission is determined to be valid transmission; and
  processing the TCP/IP transmission when the transmission is determined to be a valid transmission.

14. The method of claim 13, wherein the determining whether the TCP/IP transmission is a valid transmission includes determining whether the TCP/IP transmission has been hacked by a man-in-the-middle attack.

15. The method of claim 13, wherein the method further comprises, prior to processing the TCP/IP transmission:
  extracting the hexadecimal form of the IP address;
  converting the hexadecimal form of the IP address into a binary form of the IP address; and
  inserting the binary form of the IP address into the IP address location of the TCP/IP transmission.

16. The method of claim 13, further comprising upon receiving the TCP/IP transmission, stamping the TCP/IP transmission with a transmission identifier.

17. The method of claim 13, wherein the one or more unused options comprise options 31-252.

18. The method of claim 17, wherein the hexadecimal form of the IP address is embedded into option 31 of the header.

19. The method of claim 13, wherein the artificial intelligence module flags the TCP/IP transmission when the TCP/IP transmission is determined to be inconsistent with other TCP/IP transmissions received from the sender.

20. The method of claim 19, wherein the artificial intelligence module transmits the TCP/IP transmission that has been flagged for operator review.

* * * * *